United States Patent [19]

Hoover

[11] 3,903,316

[45] *Sept. 2, 1975

[54] FINING AND INCREASING THE CHILL HAZE STABILITY OF FERMENTED ALCOHOLIC BEVERAGES

[75] Inventor: Lonnie Daniel Hoover, Chappell Hill, Tex.

[73] Assignee: NL Industries, Inc., New York, N.Y.

[ * ] Notice: The portion of the term of this patent subsequent to June 18, 1991, has been disclaimed.

[22] Filed: Feb. 25, 1974

[21] Appl. No.: 445,141

Related U.S. Application Data

[63] Continuation-in-part of Ser. No. 310,482, Nov. 30, 1972, Pat. No. 3,818,111.

[52] U.S. Cl. ............... 426/423; 426/11; 426/16; 426/330; 426/422
[51] Int. Cl.² ............... C12C 9/08; C12C 11/00
[58] Field of Search .......... 426/330, 422, 271, 423, 426/11, 16; 252/313

[56] References Cited
UNITED STATES PATENTS

| | | | |
|---|---|---|---|
| 2,588,389 | 3/1952 | Iler | 252/313 |
| 3,617,301 | 11/1971 | Barby et al. | 426/330 |

OTHER PUBLICATIONS

Fries, et al., Filtration and Stabilization of Beer with a Nem. Silicic Acid product, Chemical Abstracts, Vol. 71, 1969 (p. 236) (48293r) QD1A51.

Suhner A. R., Agent for Stabilizing and Clarifying Beverages and Their Starting Materials, Especially Beer, Chemical Abstracts Vol. 75 1971 (p. 216) (97273a) QD1A51.

*Primary Examiner*—David M. Naff
*Attorney, Agent, or Firm*—Roy F. House; Delmar H. Larsen; Robert L. Lehman

[57] ABSTRACT

A process of treating a fermented alcoholic beverage to enhance the clarity, chill haze stability or filtration characteristics of the beverage which is characterized by the separate addition to the beverage before final filtration of a nitrogeneous carbonyl containing organic material which is water soluble or colloidially dispersible in water selected from the group consisting of gelatin, N-vinylpyrrolidone and polymers of N-vinylpyrrolidone and a polysilicic acid coagulant in the form of a hydrosol having a pH less than about 5, which has been aged for a period of time which is at least equal to 30% and less than 100% of the time for said polysilicic acid hydrosol to obtain a viscosity of 100 centipoises measured at 25°C, wherein the concentration of polysilicic acid added is greater than the concentration of the organic material and wherein the polysilicic acid and the organic material are added to the beverage such that they mutually coagulate and simultaneously fine and remove chill haze precursor substances from the beverage, followed by aging of the beverage and removal of coagulated substances from the beverage.

32 Claims, No Drawings

FINING AND INCREASING THE CHILL HAZE STABILITY OF FERMENTED ALCOHOLIC BEVERAGES

This application is a continuation-in-part of my co-pending application, Ser. No. 310,482, filed Nov. 30, 1972, now U.S. Pat. No. 3,818,111 dated June 18, 1974, incorporated herein by reference.

This invention pertains to the art of removing substances from fermented alcoholic beverages in order to improve one or more of the following characteristics of the beverage: clarity; filtration; chill haze stability.

Fermented alcoholic beverages such as those obtained from cereals and fruits, particularly beer and wine, contain therein at some stage during their preparation suspended matter which must be removed before the beverage is packaged. It is well known to clarify beverages by adding materials to the beverage which will precipitate or coagulate the suspended matter, thus making its removal easier such as by centrifugation and/or filtration. Such materials are sometimes called fining agents.

Fermented alcoholic beverages also contain various phenolic substances, proteins and protein-tannin complexes. The larger molecules of these may be removed during the clarification or fining and subsequent filtration of the beverage, however the smaller molecules remain in the beverage. Some of the tannins and proteins remaining in the beverage after final filtration may be converted into larger molecules by oxidation and other processes during storage of the beverage, or the tannins and proteins may combine to form large complex molecules. These then form a haze in the beverage. The beverage may also contain tannins, proteins and protein-tannin complexes which are soluble at room temperature but which are insoluble at the lower temperatures at which the beverage is served. These then form the commonly called chill haze which forms on chilling the beverage. All of these substances which affect the clarity of the beverage are undesirable. It is well known in the art to treat such beverages with various adsorbents or coagulants which adsorb or coagulate many of the objectionable tannis, proteins, or protein-tannin complexes from the beverage and allow their removal such as by filtration before the beverage is packaged. Such materials are sometimes called chillproofing agents.

All of the substances which settle out of the beverage are removed from the beverage by filtration, or sometimes by a combination of centrifugation and filtration. The clarity of the beverage before filtration has a direct effect on the rate of filtration of the beverage. In general, the filtration rate, measured for instance in the units of gallons of beverage per square foot of filter area per minute, decreases with an increase in the turidity (decrease in clarity) of the beverage. The various substances in the beverage, including the added materials and the coagulated and/or flocculated materials, all affect the duration of a filter run. Such substances behave differently upon filtration such that the pores within the filter become clogged thus increasing the pressure required to filter the beverage and eventually terminating the filtration. Any treatment of the beverage which not only improves the chill haze stability and/or the clarity of the beverage but which also improves the filtration rate and/or which extends the duration of a filter run, measured for instance in gallons of beverage filtered per filtration, is very desirable.

Many materials have been proposed for use as fining agents and chillproofing agents in fermented alcoholic beverages. A discussion of these and the disclosure of various references pertaining thereto is given in my copending patent application Ser. No. 310,482, filed Nov. 30, 1972, which is incorporated herein by reference. Two references pertaining to the treatment of beer with isinglass and silicic acid preparations are as follows: "Malting and Brewing Science", J. S. Hough, D. E. Briggs and R. Stevens, Chapman and Hall, Ltd., 1971, pp. 542–545; "Finings and Auxiliary Finings", J. T. Rowsell, Brewers' Guild Journal, Vol. 52, pp. 278–292, 1966.

I have found that the separate addition to a fermented alcoholic beverage before final filtration of (1) a nitrogeneous carbonyl containing organic material which is water soluble or colloidially dispersible in water selected from the group consisting of gelatin, N-vinylpyrrolidone, and polymers of N-vinylpyrrolidone and (2) a polysilicic acid coagulant in the form of a hydrosol having a pH less than about 5 which has been aged for a period of time which is at least equal to 30% of the gelation time of the sol, and which has never gelled, wherein the amount of the polysilicic acid exceeds the amount of the organic material synergistically improves the chill haze stability of the beverage and synergistically improves the clarity of the beverage when the polysilicic acid and the organic material are added to the beverage such that they mutually coagulate.

Accordingly, it is an object of this invention to provide a process of treating a fermented alcoholic beverage before final filtration, which comprises the following steps in the order indicated:

a. adding to the beverage separately and in any order a nitrogeneous carbonyl containing organic material which is water soluble or colloidially dispersible in water selected from the group consisting of gelatin, N-vinylpyrrolidone, and polymers of N-vinylpyrrolidone and a polysilicic acid coagulant in the form of a hydrosol having a pH less than about 5 which has been aged for a period of time which is at least equal to 30% of the gelation time of the sol, wherein the amount of polysilicic acid added is greater than the amount of the organic material added;

b. aging the treated beverage for a period of time sufficient to allow the nitrogeneous carbonyl containing organic material and the polysilicic acid to coagulate and combine with undesirable material in the beverage; and c. separating the coagulated substances from the beverage.

Other objects and embodiments of this invention will become apparent in the following detailed specification.

The nitrogeneous carbonyl containing organic material (hereinafter sometimes referred to as (NCCOM)) useful in the practice of this invention is selected from the group consisting of gelatin, N-vinylpyrrolidone, and polymers of N-vinylpyrrolidone which are water soluble or colloidally dispersible in water.

The gelatin useful in this invention is a standard item of commerce. It is obtained by the selective hydrolysis of collagen which is the major structural protein in skin, tendon, and bone. Edible grades for fining beverages are usually prepared from slaughterhouse bones and pigskin by processing which avoids bacterial contamination. Edible gelatin is preferred for use in the process of this invention. Gelatin consists of a mixture of water soluble proteins of high average molecular weight, approximately 15,000 to 250,000. The two general kinds of commercial gelatin manufactured are often designated as type A (derived from acid-processed collagen) and type B (from alkaline-processed collagen). Type A gelatin is preferred in the process of this invention. Gelatin is further characterized by its jelly strength, or Bloom rating, which is measured with a plunger-type instrument known as the Bloom gelometer. It determines the weight in grams required to depress a flat plunger (12.7 mm in diameter) a distance of 4 mm into a jelly containing 6.67% gelatin. The jelly is made under carefully controlled conditions and is aged for 17 hours at 10C for the Bloom test. Commercial gelatins ranging from 75 to 300 Bloom grams are available. Preferred for the process of this invention is gelatin having a Bloom rating from 150 to 300 grams.

I have found that N-vinylpyrrolidone and polymers of N-vinylpyrrolidone which are soluble or colloidially dispersible in water are effective in the process of this invention. The molecular weight or degree of polymerization of the polymers is not critical provided that the polymers are soluble or colloidially dispersible in water. Preferably the polymers are water soluble. Particularly preferred polymers are homopolymers of N-vinylpyrrolidone known in the art as polyvinylpyrrolidone (PVP). It is preferred that the molecular weight of the polyvinylpyrrolidone be greater than about 30,000.

The N-vinylpyrrolidone useful in the practice of this invention is readily available. The GAF Corp., Dyestuff & Chemical Division, markets N-vinylpyrrolidone under the trademark V-PYROL. Technical Bulletin 7543-037 published by GAF Corporation describes the properties of N-vinylpyrrolidone and processes for polymerizing N-vinylpyrrolidone with other monomers. GAF Corp. also publishes three booklets disclosing references pertaining to the properties and uses of polyvinylpyrrolidone entitled "PVP An Annotated Bibliography 1951-1966". Vol. 1 is concerned with the Chemical, Physical, and Physiological Properties of PVP, Vol. 2 is concerned with the Food, Drug, and Cosmetic Uses of PVP, while Vol. 3 is concerned with the Industrial Uses of PVP.

The homopolymers of N-vinylpyrrolidone and copolymers of N-vinylpyrrolidone with other vinyl monomers such as N-vinyl-3-methyl-2-pyrrolidone, N-vinyl-2-piperidone, N-vinyl-2-caprolactam, N-vinylsuccinimide, N-vinyl-3-morpholinone, N-vinyl-5-methyl-2-oxazolidinone, N-vinyl-5-ethyl-2-oxazolidinone, N-vinyl-2-oxazolidinone, and acrylamide may be prepared from the monomers using methods known to those skilled in that art. The use of dilute solutions of the monomers during polymerization, or the use of large amounts of catalysts are among the many methods which may be used in their preparation and are not a part of this invention.

For the treatment of the beverage an aqueous solution or colloidial dispersion of the (NCCOM) is prepared and added to the beverage to be treated. The concentration of the (NCCOM) in the solution or dispersion is not critical. The concentration should be such that the solution or dispersion can be easily mixed into and dispersed throughout the beverage. Concentrations from 1% to 10% by weight are preferred. The (NCCOM) may be added to the beverage by means of a proportioning device which delivers measured quantities of the solution or dispersion to the beverage and is conveniently done as the beverage is being transferred to a storage tank. For the fining and chillproofing of beer the solution or dispersion is conveniently proportioned into the beer as the beer is being transported from the fermentor to ruh storage. Alternatively the solution or dispersion of the (NCCOM) may be added to a tank containing a small amount of the beverage and thoroughly mixed into the beeverage by filling the tank with additional beverage, the mixing occuring as a result of the force and currents produced by the entering beverage.

The polysilicic acid coagulant used in the practice of this invention must be added to the beverage in the form of a hydrosol which has a pH less than about 5 and which has been aged for a period of time which is at least equal to 30% of the gelation time of the sol. The polysilicic acid hydrosol must never have been gelled, therefore, the maximum aging time is less than 100% of the gelation time of the hydrosol.

The polysilicic acid hydrosol is prepared by properly aging a silicic acid hydrosol prepared from an alkali metal silicate solution, preferably sodium silicate. Silicic acid can be prepared from an alkali metal silicate by rapidly reducing the pH of a sodium silicate solution to less than about 5, preferably 1.5 to 5, more preferably 2-4.

For instance, as is well known, an aqueous solution of sodium silicate having silica: sodium oxide ratios from about 0.5 to about 4.0 may be added rapidly with good mixing to an acid solution to obtain an aqueous solution of silicic acid and the sodium salt of the reacting acid. Thus the reaction of a sodium silicate with a $SiO_2$:$Na_2O$ mole ratio of 0.5 with sulfuric acid can be represented as:

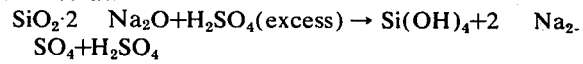

Generally when the alkali metal silicate has a $SiO_2$:$Na_2O$ mole ratio greater than 0.5 the silicic acid formed is not the monomer, $Si(OH)_4$, but a molecule containing perhaps 3-4 silicon atoms.

Alternatively silicic acid can be prepared by ion-exchanging an aqueous alkali metal silicate solution with a cation-exchange resin in the hydrogen form. Thus an aqueous alkali metal silicate solution, preferably sodium silicate, is placed in intimate contact with a cation-exchange resin in its hydrogen form whereby the sodium ions in the silicate solution are removed by the resin and replaced with hydrogen ions from the resin. Representative ion-exchange processes to prepare the silicic acid hydrosol are disclosed in the following patents, all of which are incorporated herein be reference: U.S. Pat. Nos. 2,588,389; 2,726,216; 3,649,556. Particularly preferred is the process disclosed in U.S. Pat. No. 3,649,556.

Silicic acid is unstable and commences to polymerize as soon as it is formed by splitting off water, viz:

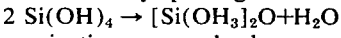

As the polymerization proceeds the overall reaction may be represented by $$X\ Si(OH)_4 \rightarrow X\ SiO_{n/2}(OH)_{4-n} + X\ (n/2)\ H_2O$$

where X represents the number of silicic acid molecules which polymerize to form an individual polysilicic acid particle and $n$ represents the average number of hydroxyl groups in the silicic acid molecules which have undergone the condensation polymerization. The rate of polymerization increases as the concentration of silicic acid in the aqueous silicic acid solution increases, as the temperature increases, and as the pH increases to about 5–8 in which pH range the polymerization is very rapid. As the polymerization of the polysilicic acid increases the viscosity and turbidity of the polysilicic acid hydrosol increases to such an extent that the polysilicic acid forms a gelatinous semi-solid gel. This is commonly called a silica hydrogel and the time required to form the hydrogel is called the gelation time of the polysilicic acid hydrosol.

The silicic acid hydrosol obtained either by acid neutralization or by ion-exchange of a sodium silicate solution has a pH within the range from 1.5 to 5, preferably 2 to 4, still more preferably 2.5 to 3, and has a silicic acid concentration from 1% to about 10% calculated as weight percent silica, preferably 3% to 7%. Generally about 7% is the maximum concentration which can be commercially obtained by an ion-exchange process. The alkali metal silicate used to prepare the silicic acid should have a silica:alkali metal oxide ratio from 1:1 to about 4:1, preferably 2:1 to about 4:1.

An ion-exchange process is the preferred process for preparation of the polysilicic acid hydrosol since the alkali metal ions are removed from the hydrosol and are not added to the beverage to be treated. The process disclosed in U.S. Pat. No. 3,649,556 is particularly preferred as it is capable of producing reproducible hydrosols of low turbidity at a commercial rate.

The silicic acid initially formed is of low molecular weight and is not effective in the process of this invention. The polysilicic acid hydrosol useful in the process of the present invention must be aged for a period of time which is at least equal to 30% of its gelation time to be effective in this invention. However the hydrosol must not be aged to the extent that gelation occurs. Thus the maximum aging period of the hydrosol is less than 100% of the gelation time of the hydrosol. I have determined that the hydrogel which occurs upon gelation of the hydrosol efficiently increases the chill haze stability of beverages when used in conjunction with the (NCCOM). However, the very remarkable fining results obtained by the process of this invention are not consistently obtained with the hydrogel although some fining of the beverage does result from the combination treatment.

As noted hereinbefore the polymerization rate of the polysilicic acid increases with an increase in temperature, an increase in the silica concentration, and an increase in pH. Increasing one or more of these variables will increase the rate of polymerization and will serve to decrease the aging time in order to achieve any particular degree of polymerization. The pH should not be increased above about 5 because of the very rapid polymerization rate above this pH. Conversely, if so desired, decreasing one or more of these variables will decrease the polymerization rate and increase the aging time to achieve any particular degree of polymerization desired. For instance, a properly aged and effective polysilicic acid hydrosol can be stored at a temperature above but near freezing such as at 30F for extended periods of time during which the polymerization proceeds to gelation very slowly and during which the polysilicic acid hydrosol is very effective in the process of the present invention.

The data in the following table were obtained from a polysilicic acid hydrosol prepared by the ion-exchange process of U.S. Pat. No. 3,649,556 containing 5% polysilicic acid. The pH of the hydrosol was adjusted immediately after its preparation with either sodium hydroxide or sulfuric acid, as required, to give the indication pH. The hydrosols were placed in constant temperature baths at the indicated temperature and the viscosity of each hydrosol was determined as a function of time. The data in the table is the number of hours the sol was aged until it reached a viscosity of 100 centipoise as measured in a 25C water jacketed Brookfield RVT microviscometer at 20 RPM. This was arbitrarily taken as the gelation point inasmuch as the viscosity increases rapidly as the hydrosol approaches the gelled semi-solid hydrogel state.

| Experimental Gelation Times for 5% Polysilicic Acid Hydrosol | | | | |
|---|---|---|---|---|
| Original pH at 20C | Hours at Indicated Temperature | | | |
| | 0C | 15C | 30C | 45C |
| 1.5 | 1536 | 400 | 115 | 34 |
| 2.0 | 1440 | 288 | 76 | 24.5 |
| 2.5 | 720 | 195 | 62 | 21 |
| 3.0 | 624 | 150 | 46 | 14 |
| 3.5 | 336 | 74 | 23 | 5.75 |
| 4.0 | 140 | 28.5 | 7.8 | 2.5 |

For the treatment of the beverage the polysilicic acid hydrosol is conveniently proportioned into the beverage as the beverage is being transported to a storage tank. In the case of beer this may be achieved as the beer is transferred from the fermentor to ruh storage. However, depending on the particular brewing process used in any given brewery, the beer may be aged after fermentation before treatment in the process of the present invention. Indeed, I have found that the amount of (NCCOM) and polysilicic acid may be decreased if the brew is aged after fermentation before treatment. Alternatively any method of addition of the polysilicic acid hydrosol may be used which mixes the sol throughout the beverage. For the fining and chill-proofing of beer and wine, it is preferred that the (NCCOM) and the polysilicic acid be added after primary fermentation and before final filtration.

The amount of the (NCCOM) and the polysilicic acid added to the beverage for effective fining (clarification) and chillproofing will depend greatly on the particular beverage to be treated, on the clarity of the beverage desired, and on the chill haze stabiility desired. In particular beer which has been aged after fermentation and before treatment requires less (NCCOM) and polysilicic acid to obtain a desired clarity than would have been needed had the beer been treated immediately after fermentation. The amount of (NCCOM) and polysilicic acid needed for efficient fining decreases as the turbidity of the beverage to be treated decreases. It is desirable that the turbidity of the beverage be decreased at least 50% by the process of this invention. In general from about 5 to 100 p.p.m. (parts by weight per million parts of the beverage) of the (NCCOM) and from about 10 to 300 p.p.m. of the polysilicic acid will be sufficient. Preferably the concentration of the (NCCOM) will be from about 5 to 50 p.p.m. and the concentration of polysilicic acid will be from about 10 p.p.m. to 250 p.p.m. In all beverages the concentration of the polysilicic acid must exceed the concentration of the (NCCOM). I have found that the turbidity of the treated beverage increases (the clarity decreases) as the polysilicic acid to (NCCOM) weight ratio increases from 0 to 1 indicating that the polysilicic acid has a detrimental effect on (NCCOM) treated beer within this range of treatment. The enhanced fining results of this invention occur only when the weight ratio of polysilicic acid to (NCCOM) is greater than 1.

The order of addition of the (NCCOM) and the polysilicic acid to the beverage is generally not critical and either material may be added to the beverage first. I have found, however, that the fining of some beers is better if the (NCCOM) is added before the polysilicic acid. Thus it is preferred that the (NCCOM) be added to the beverage before the polysilicic acid is added. It is critical, however, that the (NCCOM) and the polysilicic acid be added separately to the beverage. I have found that the enhanced synergistic fining results obtained by the process of the invention are completely reversed if the (NCCOM) and the polysilicic acid are mixed together before adding them to the beverage to be treated, although enhanced chill haze stability of the beverage is obtained.

It is necessary to add the (NCCOM) and the polysilicic acid to the beverage within a time period of one another such that they will mutually coagulate and combine with one another during the subsequent aging of the beverage. clarification is well known, when the (NCCOM) is added to the beverage it reacts with negatively charged colloids and materials in the beverage. The polysilicic acid, which is negatively charged, reacts with positively charged colloids and materials in the beverage. Apparently if either of these additives is added to the beverage to be treated so that they react with these oppositely charged colloids and materials in the beverage, their reactivity is decreased, i.e., their charge is neutralized, sufficiently that they can not subsequently react with the other additive when it is added to the beverage. This results in poor beverage clarification and the enhanced synergistic fining results obtained by the process of the invention are not obtained.

The maximum time period which can be tolerated between the addition of the (NCCOM) and the polysilicic acid will vary depending on the particular beverage to be treated, the concentration of negatively charged colloids and materials in the beverage, the concentration of positively charged colloids and materials in the beverage, and the amount of (NCCOM) and polysilicic acid added to the beverage. In general I have found that the time period between addition of the (NCCOM) and the polysilicic during which the process of this invention is effective is longer when the (NCCOM) is added to the beverage first. The maximum time period between the additions is preferably less than 24 hours, more preferably less than about 4 hours. Still more preferably it is preferred that the (NCCOM) and the polysilicic acid be added to the beverage separately but concurrently as the beverage is being transferred from one location to another.

After addition of the (NCCOM) and the polysilicic acid to the beverage, the treated beverage must be aged for a period of time which is sufficient to allow the (NCCOM) and polysilicic acid to mutually coagulate. During this aging period the beverage is simultaneously fined and chill haze precursor substances are removed from the beverage as the coagulated material settles out of the beverage. The aging time will depend on the type and characteristics of the beverage treated, the amount of (NCCOM) and polysilicic acid added to the beverage, and on the turbidity or clarity of the beverage which is desired before filtration. Larger concentrations of polysilicic acid and (NCCOM) affect a more rapid clarification rate such that the treated beverage will achieve a certain (lower) turbidity level faster than when the beverage is treated with smaller concentrations of these additives. The final turbidity of the beer before filtration may be the same, however, if the beer is aged for a long period of time after treatment.

Following the aging period the beverage must be processed to remove the coagulated substances from the beverage, such as by centrifugation, filtration, or decantation. This is conveniently done by filtering the beverage. I have found that the filterability of the beverage increases as the turbidity of the beverage decreases.

It may be desirable to add a proteolytic enzyme such as papain to the treated and filtered beverage to further increase the chill haze stability of the beverage. In this case less enzyme is needed than would be needed in the absence of the prior treatment of the beverage with the polysilicic acid and the (NCCOM) in accordance with this invention.

The following examples illustrate the process of the invention and the benefits afforded through the utilization thereof.

In these examples the gelatin used was obtained from the Grayslake Gelatin Co. It is a 200 Bloom U.S.P. Type A Gelatin, pH 4.55–4.60. It was added to the beverage in the form of a 2% by weight aqueous solution.

EXAMPLE 1

The beer employed in this example was obtained immediately prior to ruh storage from a commercial brewery and transferred to a pilot brewery. It was bottled in 12 oz. clear bottles and crowned with perforated caps and rubber stoppers to allow for syringe injection of the desired treating materials. A silicic acid hydrosol was prepared by the process claimed in U.S. Pat. No. 3,649,556. The concentration of polysilicic acid in the hydrosol was adjusted to 5.0% with deionized water. The hydrosol had a pH of 2.5. The polysilicic acid hydrosol was aged at room temperature for various periods of time before treatment of the beer. The gelation time of the hydrosol was between 42 and 48 hours. The fermented beer was treated with the amount of gelatin and the amount of polysilicic acid indicated in Table 1A. The gelatin was added to the beer first followed immediately by the polysilicic acid. The turbidity of the treated beer samples was then monitored while they aged at 30–32F until a total of nine days had elapsed from the initiation of the treatments. During this time the gelatin and the polysilicic acid reacted forming a flocculant precipitate which simultaneously fined and removed chill haze precursor substances from the beer, and during which time gelatin, polysilicic acid and the materials removed from the beer settled as a sludge to the bottom of the bottles to an extent depending on the efficiency of the treatment. The turbidities of the treated beer samples were determined with a commercial nephelometer (HAZE METER, Type UKM 16, manufactured by Radiometer of Copenhagen), expressed as A.S.B.C. Formazin Turbidity Units to give an indication of the fining (clarity) of the beer. A summary of the data obtained is given in Table 1A.

Table 1 A

| Treatment | Property* | \multicolumn{7}{c}{Hours Polysilicic Acid Sol (PSA) Aged before Treatment} |
|---|---|---|---|---|---|---|---|---|
| | | 0 | 6 | 12 | 18 | 24 | 30 | 42 |
| 200 ppm PSA + 50 ppm Gelatin | A | 216+ | 24 | 60 | 54 | 48 | 42 | 174+ |
| | B | 230 | 163 | 138 | 113 | 104 | 71 | 114 |
| O PSA + 50 ppm Gelatin | A | 216+ | 210+ | 204+ | 198+ | 192+ | 186+ | 174+ |
| | B | 121 | 304 | 117 | 130 | 98 | 100 | 610 |
| 200 ppm PSA + O Gelatin | A | 216+ | 210+ | 204+ | 198+ | 48 | 42 | 30 |
| | B | 650+ | 604 | 288 | 542 | 198 | 212 | 590 |

*Property A = Hours each treated beer sample aged for maximum fining.
*Property B = Lowest turbidity obtained, FTU The data indicate that the polysilicic acid hydrosol needs to be aged at least about 30% of its gelation time, which in this case was about 45 hours, before it is effective in combination with gelatin for the fining of beer.

EXAMPLE 2A

The beverage employed in this example was beer obtained from a commercial brewery immediately prior to ruh storage, transferred to a pilot brewery and bottled as in Example 1 A. This fermented beer was treated with 50 p.p.m. (parts, by weight, per million parts of beer) of gelatin followed immediately with 200 ppm of polysilicic acid. The polysilicic acid was prepared by producing a hydrosol by the process of U.S. Pat. No. 3,649,556 and aging the hydrosol at room temperature for the time period given in Table 2 A. The hydrosol contained 5.0% polysilicic acid and an adjusted pH of 2.5. The hydrosol gelled, as evidenced by a 20 RPM Brookfield viscosity of 100 centipoise, after aging about 80 hours. During the aging of the polysilicic acid hydrosol the 20 RPM Brookfield viscosity and the turbidity of the hydrosol were obtained at the time that the beer was treated with the polysilicic acid. After treatment the turbidity of the treated beer was determined periodically as the beer aged for a period of time up to about 15 days. A summary of the data obtained is given in Table 2 A.

After the polysilicic acid hydrosol had aged for 24, 48, or 72 hours a sample of the hydrosol was cooled to 30F–32F and aged at that temperature. Periodically the beer was treated as above with these samples of polysilicic acid hydrosol. The room temperature viscosity and turbidity of these hydrosols at the time of beer treatment were also obtained. This data is also given in Table 2 A.

Table 2 A

| Polysilicic Acid Hydrosol | | | | Treated Beer Samples | |
|---|---|---|---|---|---|
| Hours Aged | Aging Temp. F | Viscosity cp. | Turbidity FTU | Lowest Turbidity Obtained FTU | Maximum Hours to Obtain the Lowest Turbidity |
| 2 | R.T. | 1.7 | 43 | 298 | 336 |
| 10 | R.T. | 1.7 | 50 | 388 | 312 |
| 18 | R.T. | 1.7 | 63 | 165 | 82 |
| 22 | R.T. | 1.7 | 79 | 130 | 192 |
| 28 | R.T. | 1.7 | 105 | 80 | 138 |
| 34 | R.T. | 1.7 | 125 | 73 | 132 |
| 40 | R.T. | 1.7 | 160 | 75 | 126 |
| 46 | R.T. | 3.3 | 176 | 70 | 75 |
| 52 | R.T. | 3.3 | 225 | 65 | 114 |
| 58 | R.T. | 5.0 | 268 | 107 | 156 |
| 65 | R.T. | 8.3 | 319 | 71 | 77 |
| 70 | R.T. | 10.9 | 370 | 76 | 144 |
| 76 | R.T. | 19.8 | 416 | 83 | 138 |
| 90 | R.T. | 330 | 635 | 468 | 312 |

Table 2 A-continued

| Polysilicic Acid Hydrosol | | | | Treated Beer Samples | |
|---|---|---|---|---|---|
| Hours Aged | Aging Temp. F | Viscosity cp. | Turbidity FTU | Lowest Turbidity Obtained FTU | Maximum Hours to Obtain the Lowest Turbidity |
| 100 | R.T. | (a) | (a) | 394 | 312 |
| 118[b] | 31 | 3.3 | 186 | 88 | 192 |
| 142[b] | 31 | 3.3 | 205 | 68 | 336 |
| 166[b] | 31 | 5.0 | 248 | 72 | 336 |
| 190[b] | 31 | 5.0 | 275 | 73 | 168 |
| 94[c] | 31 | 8.3 | 340 | 90 | 336 |
| 118[c] | 31 | 16.5 | 368 | 64 | 336 |
| 142[c] | 31 | 24.8 | 400 | 66 | 336 |
| 166[c] | 31 | 61.0 | 465 | 93 | 336 |
| 70[d] | 31 | 220 | 532 | 105 | 336 |
| 94[d] | 31 | (a) | 562 | 98 | 336 |

[a] = too large for measurement
[b] = Hydrosol previously aged 24 hours at R.T.
[c] = Hydrosol previously aged 48 hours at R.T.
[d] = Hydrosol previously aged 72 hours at R.T.

The data indicate that the polysilicic acid hydrosol must be aged at least about 30% of its gelation time before the enhanced fining results are obtained. The data also indicate that a hydrosol which has been properly aged can be subsequently stored for a considerable period of time at a low temperature during which it remains effective for the treatment of fermented beverages. I have found by extensive experimentation that the viscosity of a polysilicic acid hydrosol commences to increase at approximately one-half (50%) of its gelation time, and this is also indicated in Table 2 A. Accordingly a very convenient control variable useful in the process of the present invention is to allow the polysilicic acid hydrosol to age until the viscosity starts to increase. The sol is then always effective in this invention. The data also indicate that the turbidity of the polysilicic acid hydrosol increases as the molecular weight of the polysilicic acid increases, and that, for a hydrosol having an initial turbidity less than about 50 FTU, that the turbidity of the aged hydrosol should not be in excess of about 500 FTU.

EXAMPLE 3 A

The beer of Example 2 A was used in this Example. The beer was treated with various amounts of gelatin followed immediately by various amounts of polysilicic acid hydrosol as indicated in Table 3 A. The polysilicic acid hydrosol was the same hydrosol used in Example 2 A aged at room temperature for the number of hours indicated in Table 3 A. The turbidity of the treated beer was monitored as before. The data obtained are given in Table 3 A.

Table 3 A

| Hydrosol Hours Aged | Hydrosol ppm | Gelatin ppm | Turbidity of Treated Beer, FTU Days Treated Beer Aged | | | |
|---|---|---|---|---|---|---|
| | | | 2 | 4 | 7 | 14 |
| 46 | 90 | 30 | 163 | 122 | 106 | 95* |
| 46 | 30 | 30 | 400 | 258 | 202 | 170* |
| 46 | 22.5 | 30 | 380 | 212 | 163 | 140* |
| 46 | 15 | 30 | 352 | 190 | 153 | 135* |
| 46 | 0 | 30 | 392 | 221 | 143 | 88* |
| 70 | 90 | 30 | 173 | 132 | 108 | 115 |
| 70 | 30 | 30 | (a) | 476 | 381 | 214 |
| 70 | 22.5 | 30 | 514 | 295 | 180 | 160 |
| 70 | 15 | 30 | 482 | 268 | 164 | 144 |
| 70 | 0 | 30 | 320 | 210 | 125 | 96 |

*= 15 days aging
(a)= too large for measurement

The data indicate that the amount of polysilicic acid added must exceed the amount of gelatin added to the beverage, and that at weight ratios of polysilicic acid to gelatin less than 1 a detrimental effect on the clarity of the beverage is obtained.

EXAMPLES 4 A and 4 B

Fresh ruh beer was obtained from a commercial brewery, transferred to a pilot brewery and bottled as in Example 1 A. Samples of this beer were treated with gelatin and polysilicic acid in the order indicated in Table 4 A, in the amounts indicated in Table 4 A, and with a time lapse between the addition of the gelatin and the polysilicic acid as indicated in Table 4 A. The polysilicic acid hydrosols were stored at 30°–32°F after the beer treatment started so that they would not change appreciably during this time lapse between additions. The turbidity of the treated beers aged at 30°–32°F was determined periodically. After the treated beer had aged for 11 days the samples were then warmed to room temperature, filtered through 1.2μ MILLIPORE filters, re-bottled with standard caps and placed in a cooler at 30°–32°F. The chill haze stability was determined in a standard manner, after the beer samples were stored for the indicated time.

Two different preparations of polysilicic acid were used in this investigation. One hydrosol was prepared by the process of U.S. Pat. No. 3,649,556 at 5.0% polysilicic acid, pH of 2.5 which was aged 36 hours at room temperature. The other hydrosol was prepared by adding a sodium silicate solution rapidly to a hydrochloric acid solution agitated with a magnetic stirrer such that the hydrosol contained 5% polysilicic acid and had a pH of 2.5. The hydrosol was then aged 36 hours at room temperature before treating the beer. The data obtained are summarized in Table 4 A and Table 4 B.

Table 4A

| | | | PSA Prepared by Ion Exchange | | | | PSA Prepared by Neutralization of Na Silicate | | | |
|---|---|---|---|---|---|---|---|---|---|---|
| | | | PSA Added Before Gelatin | | Gelatin Added Before PSA | | PSA Added Before Gelatin | | Gelatin Added Before PSA | |
| ppm PSA | ppm Gelatin | Time Lapse Between Additions, Hours | Lowest Turbidity Obtained FTU | Days Fining to Achieve Lowest Turbidity | Lowest Turbidity Obtained FTU | Days Fining to Achieve Lowest Turbidity | Lowest Turbidity Obtained FTU | Days Fining to Achieve Lowest Turbidity | Lowest Turbidity Obtained FTU | Days Fining to Achieve Lowest Turbidity |
| 200 | 50 | 0 | 97 | 7 | 78 | 8 | 91 | 7 | 98 | 8 |
| 200 | 50 | 1 | 133 | 8 | 82 | 8 | 125 | 8 | 107 | 11 |
| 200 | 50 | 4 | 360 | 8 | 98 | 7 | 150 | 11 | 73 | 8 |
| 200 | 50 | 24 | 530 | 8 | 110 | 8 | 252 | 8 | 378 | 11 |
| 150 | 30 | 0 | 115 | 8 | 95 | 6 | 139 | 8 | 95 | 8 |
| 150 | 30 | 1 | 106 | 7 | 106 | 11 | 100 | 8 | 105 | 8 |
| 150 | 30 | 4 | 108 | 8 | 77 | 8 | 127 | 11 | 86 | 8 |
| 150 | 30 | 24 | 250 | 11 | 134 | 11 | 324 | 11 | (a) | 11 |
| 100 | 20 | 0 | 120 | 7 | 122 | 8 | 105 | 8 | 63 | 7 |
| 100 | 20 | 1 | 115 | 8 | 128 | 7 | 150 | 11 | 116 | 7 |
| 100 | 20 | 4 | 132 | 7 | 114 | 8 | 100 | 8 | 93 | 8 |
| 100 | 20 | 24 | 165 | 11 | 196 | 6 | 155 | 11 | (a) | 11 |
| 50 | 10 | 0 | 234 | 7 | 165 | 8 | 175 | 8 | 190 | 6 |
| 50 | 10 | 1 | 625 | 8 | 224 | 7 | 220 | 3 | 218 | 7 |
| 50 | 10 | 4 | 390 | 11 | 502 | 8 | 300 | 2 | 359 | 8 |
| 50 | 10 | 24 | 606 | 8 | (a) | 11 | 270 | 3 | (a) | 11 |
| 200 | 0 | — | 640 | 8 | — | — | 218 | 8 | — | — |
| 0 | 50 | — | — | — | 464 | 7 | — | — | 464 | 7 |

(a) = too large to measure

Table 4 B

| | | | PSA Prepared by Ion Exchange | | | | PSA Prepared by Neutralization of Na Silicate | | | |
|---|---|---|---|---|---|---|---|---|---|---|
| | | | PSA/Gelatin(a) | | Gelatin/PSA(b) | | PSA/Gelatin(a) | | Gelatin/PSA(b) | |
| | | Time Lapse Between Additions, | Chill Haze, FTU | | Chill Haze, FTU | | Chill Haze, FTU | | Chill Haze, FTU | |
| ppm PSA | ppm Gelatin | Hours | 24 Hr. | 192 Hr. | 24 Hr. | 192 Hr. | 24 Hr. | 192 Hr. | 24 Hr. | 192 Hr. |
| 200 | 50 | 0 | 55 | 56 | 84 | 86 | 44 | 77 | 68 | 71 |
| 200 | 50 | 1 | 56 | 68 | 62 | 72 | 52 | 88 | 42 | 73 |
| 200 | 50 | 4 | 46 | 67 | 50 | 60 | 47 | 73 | 54 | 65 |
| 200 | 50 | 24 | 66 | 56 | 68 | 77 | 43 | 68 | 85 | 145 |
| 150 | 30 | 0 | 55 | 73 | 47 | 55 | 64 | 84 | 57 | 80 |
| 150 | 30 | 1 | 48 | 73 | 58 | 95 | 44 | 67 | 59 | 78 |
| 150 | 30 | 4 | 103 | 128 | 80 | 82 | 65 | 82 | 81 | 144 |
| 150 | 30 | 24 | 49 | 71 | 41 | 50 | 45 | 50 | 70 | 128 |
| 100 | 20 | 0 | 43 | 76 | 70 | 75 | 62 | 94 | 45 | 57 |
| 100 | 20 | 1 | 46 | 65 | 64 | 92 | 77 | 106 | 57 | 70 |
| 100 | 20 | 4 | 62 | 92 | 75 | 98 | 61 | 84 | 71 | 80 |
| 100 | 20 | 24 | 65 | 70 | 51 | 77 | 58 | 63 | 200 | 288 |
| 50 | 10 | 0 | 62 | 110 | 50 | 112 | 112 | 125 | 79 | 99 |
| 50 | 10 | 1 | 66 | 127 | 65 | 92 | 44 | 98 | 72 | 78 |
| 50 | 10 | 4 | 45 | 53 | 72 | 116 | 68 | 118 | 48 | 68 |

Table 4 B-continued

| ppm PSA | ppm Gelatin | Time Lapse Between Additions, Hours | PSA Prepared by Ion Exchange | | | | PSA Prepared by Neutralization of Na Silicate | | | |
|---|---|---|---|---|---|---|---|---|---|---|
| | | | PSA/Gelatin(a) Chill Haze, FTU | | Gelatin/PSA(b) Chill Haze, FTU | | PSA/Gelatin(a) Chill Haze, FTU | | Gelatin/PSA(b) Chill Haze, FTU | |
| | | | 24 Hr. | 192 Hr. | 24 Hr. | 192 Hr. | 24 Hr. | 192 Hr. | 24 Hr. | 192 Hr. |
| 50 | 10 | 24 | 57 | 83 | 70 | 104 | 73 | 78 | (c) | (c) |
| 200 | 0 | — | 60 | 84 | — | — | 68 | 88 | — | — |
| 0 | 50 | — | — | — | 110 | 190 | — | — | 110 | 190 |

(a) = Polysilicic acid added first, before gelatin
(b) = Gelatin added first, before polysilicic acid
(c) = too large to measure The data indicate that for efficient fining: (1) the time lapse between addition of the gelatin and the polysilicic acid must be short enough that the gelatin and polysilicic acid mutually coagulate, interact one with another, and is generally less than 24 hours and preferably no more than about 4 hours; (2) as the concentration of gelatin and polysilicic acid decreases the effective treatment period between the additions appear to decrease; (3) it is preferable to add the (NCCOM) to the beverage before addition of the polysilicic acid; (4) the process of this invention gives enhanced fining results over the use of either the (NCCOM) or the polysilicic acid alone. The data indicate that for chillproofing, the time lapse between addition of the gelatin and the polysilicic acid has no general effect on the chill haze stability of the treated beverage, and that the process of this invention gives enhanced chillproofing results over the use of either the (NCCOM) or the polysilicic acid alone.

EXAMPLE 5 A

The beer of Example 4 A, before bottling, was used in this Example. After the beer was transferred to the Pilot Brewery it was aged for 22 days before treatment at 32–34F. During this aging of the fermented beer the turbidity decreased from greater than 650 to 246 FTU. This aged beer was bottled as in Example 1 A and thereafter treated first with gelatin followed immediately by polysilicic acid in the amounts given in Table 5 A. The turbidity of the treated beer aged at 30–32F was determined periodically over a fining period of 23 days. The polysilicic acid hydrosol was prepared by the ion-exchange process of U.S. Pat. No. 3,649,556 at 5% polysilicic acid, pH of 2.5, and was aged 34 hours at room temperature. The data obtained are given in Table 5 A.

Table 5 A

| ppm Gelatin | ppm Polysilicic Acid | Lowest Turbidity Obtained, FTU | Days Fining to Obtain Lowest Turbidity |
|---|---|---|---|
| 50 | 200 | 51 | 6 |
| 30 | 150 | 54 | 12 |
| 20 | 100 | 56 | 7 |
| 20 | 50 | 70 | 12 |
| 10 | 50 | 68 | 15 |
| 10 | 30 | 76 | 15 |
| 5 | 30 | 90 | 12 |
| 5 | 20 | 87 | 12 |
| 5 | 15 | 97 | 7 |
| 30 | 0 | 103 | 23 |
| 0 | 200 | 110 | 23 |
| 0 | 100 | 178 | 6 |
| 0 | 50 | (a) | 23 |

(a) = too large to measure

Comparison of the data obtained with the data given in Table 4 A indicate that decreased amounts of (NCCOM) and polysilicic acid are needed to obtain a desired beverage clarity if the beverage is aged before treatment. Thus as the turbidity of the beverage to be treated decreases, the amounts of (NCCOM) and polysilicic acid needed to obtain the enhanced fining results of this invention decreases.

EXAMPLE 6 A

Fresh ruh was obtained from 3 commercial breweries and another beer was obtained from another batch from one of these breweries. After bottling the beers were treated with various amounts of gelatin followed immediately with various amounts of polysilicic acid. The polysilicic acid hydrosol was prepared by an ion-exchange process and aged for approximately 50% of its gelation time. The turbidity of the treated beers after a definite fining period was measured. The data obtained are given in Table 6 A. The turbidity of the untreated beers after the indicated fining period were as follows: Beer A–260; Beer B–405; Beers C–1 and C–2 — too large to measure (greater than 650).

Table 6 A

| Beer | ppm PSA | Hours Beer Fined | Relative Fining Efficiency | | | | | | | |
|---|---|---|---|---|---|---|---|---|---|---|
| | | | 1 | | 2 | | 3 | | 4 | |
| | | | P/G* | FTU | P/G | FTU | P/G | FTU | P/G | FTU |
| A | 75 | 23 | 7.5 | 59 | 3 | 78 | 1 | 107 | 1.5 | 148 |
| A | 100 | 23 | 2 | 37 | 4 | 38 | 10 | 38 | 1.3 | 62 |
| A | 200 | 23 | 20 | 28 | 8 | 38 | 2.7 | 63 | 4 | 114 |
| A | 300 | 23 | 6 | 27 | 4 | 38 | 12 | 41 | 30 | 74 |
| B | 50 | 21 | 3.3 | 213 | 1.7 | 268 | (a) | 310 | 1 | 330 |
| B | 100 | 21 | 6.7 | 185 | 3.3 | 212 | (a) | 250 | 2 | 268 |
| B | 150 | 21 | 10 | 88 | 5 | 125 | (a) | 145 | 3 | 168 |
| B | 200 | 21 | 13.3 | 110 | (a) | 115 | 6.7 | 125 | 4 | 128 |
| C–1 | 50 | 20 | 1.7 | 286 | 3.3 | 300 | 2.5 | 326 | 1 | 342 |
| C–1 | 75 | 20 | 2.5 | 185 | 5 | 215 | 1.5 | 220 | 3.8 | 229 |
| C–1 | 100 | 20 | 3.3 | 172 | 2 | 176 | 5 | 188 | 6.7 | 232 |
| C–1 | 200 | 20 | 4 | 134 | 6.7 | 139 | 13.3 | 176 | 10 | 194 |
| C–2 | 50 | 168 | 5 | 110 | 2.5 | 142 | 1.7 | 163 | 1 | 395 |
| C–2 | 75 | 168 | 5 | 156 | 3.3 | 165 | 2.5 | 170 | 2 | 178 |
| C–2 | 100 | 168 | 7.5 | 133 | 5 | 132 | 3.8 | 136 | 3 | 138 |

Table 6 A-continued

| Beer | ppm PSA | Hours Beer Fined | Relative Fining Efficiency | | | | | | | |
|------|---------|------------------|------|-----|------|-----|------|-----|------|-----|
| | | | P/G* 1 | FTU | P/G 2 | FTU | P/G 3 | FTU | P/G 4 | FTU |
| C—2 | 200 | 168 | 5 | 118 | 6.7 | 123 | 10 | 145 | 20 | 165 |

*P/G = weight ratio of polysilicic acid to gelatin which produced the indicated turbidity
(a) = No gelatin was added to the beer, hence P/G = infinity The data obtained indicate that for efficient fining the polysilicic acid to (NCCOM) weight ratio must be greater than 1.

EXAMPLE 7 A

The beer employed in these tests was obtained immediately prior to ruh storage from a commercial brewery, transferred to the pilot brewery and bottled as in Example 1 A. Duplicate bottles of this fermented beer were treated with 200 ppm of polysilicic acid and 50 ppm of either gelatin, polyvinylpyrrolidone (PVP) or N-vinylpyrrolidone (NVP). The polysilicic acid was added in the form of a polysilicic acid hydrosol prepared as in Example 2 A and aged 40 hours before use. The order of addition of the polysilicic acid and the (NCCOM) to the beer was varied as indicated in Table 7 A. A time lapse of less than 5 minutes occurred between additions. The polysilicic acid and the (NCCOM) were also mixed together before their addition to the beer to illustrate the enhanced results obtained in the fining and chillproofing of fermented beverages by the separate addition of the polysilicic acid and the (NCCOM). The treated bottles of beer were then evaluated and processed as in Example 4 B. The data obtained are given in Table 7.

Table 7 A 50 ppm (NCCOM) + 200 ppm Polysilicic Acid (PSA)

| (NCCOM) | Additive Added First | Formazin Turbidity Units | | | | |
|---------|----------------------|------|------|------|------|------|
| | | Hours Fining | | | Chill Haze | |
| | | 24 | 96 | 168 | 24 Hr. | 168 Hr. |
| Gelatin | (NCCOM) | 137 | 99 | 73 | 49 | 97 |
| Gelatin | PSA | 207 | 104 | 77 | 42 | 92 |
| Gelatin | Mixed[a] | 650+ | 650+ | 650+ | 64 | 123 |
| PVP K-90[b] | (NCCOM) | 176 | 139 | 115 | 49 | 83 |
| PVP K-90 | PSA | 166 | 126 | 103 | 49 | 87 |
| PVP K-90 | Mixed | 589 | 587 | 512 | 52 | 94 |
| NVP[c] | (NCCOM) | 182 | 136 | 118 | 48 | 77 |
| NVP | PSA | 139 | 102 | 102 | 49 | 75 |
| NVP | Mixed | 650+ | 609+ | 569+ | 76 | 125 |

[a]The (NCCOM) and the polysilicic acid were mixed together in a syringe before treating the beer. Not an illustration of this invention.
[b]PVP K-90 = polyvinylpyrrolidone, molecular weight 360,000; product of GAF Corporation.
[c]= N-Vinyl-2-pyrrolidone It is to be understood that for the purposes of this invention the term "beer" represents beer, ale, stout, malt liquor and other similarly prepared fermented cereal beverages, and the term "gelation time" represents the aging time for a hydrosol to obtain a viscosity of 100 centipoises measured at 25C.

I claim:

1. A process of treating a fermented alcoholic beverage before final filtration of said beverage, which comprises the following steps in the order indicated:
   a. adding to the beverage separately and in any order a nitrogeneous carbonyl containing organic material which is water soluble or colloidally dispersible in water selected from the group consisting of gelatin, N-vinylpyrrolidone, and polymers of N-vinylpyrrolidone and a polysilicic acid coagulant in the form of a hydrosol having a pH less than about 5 which has been aged for a period of time which is at least equal to 30% and less than 100% of the time for said polysilicic acid hydrosol to obtain a viscosity of 100 centipoises measured at 25C, wherein the amount of said polysilicic acid added is greater than the amount of said nitrogeneous carbonyl containing organic material;
   b. aging the treated beverage for a period of time sufficient to allow the nitrogeneous carbonyl containing organic material and the polysilicic acid to coagulate and combine with undesirable material in said beverage; and
   c. separating the coagulated substances from said beverage.

2. The process of claim 1 wherein said beverage is beer.

3. The process of claim 2 wherein said nitrogeneous carbonyl containing organic material is gelatin.

4. The process of claim 3 wherein said gelatin is added to said beer before said polysilicic acid is added to said beer.

5. The process of claim 1 wherein the amount of said nitrogeneous carbonyl containing organic material added is from about 5 to 100 p.p.m., wherein the amount of said polysilicic acid added is from about 10 to 300 p.p.m., and wherein the weight ratio of said polysilicic acid to said nitrogeneous carbonyl containing organic material is less than 20.

6. The process of claim 5 wherein said beverage is beer.

7. The process of claim 6 wherein said nitrogeneous carbonyl containing organic material is gelatin.

8. The process of claim 7 wherein said gelatin is added to said beer before said polysilicic acid is added to said beer.

9. The process of claim 1 wherein said polysilicic acid hydrosol is obtained by placing an aqueous solution of sodium silicate into intimate contact with a cation exchange resin in its hydrogen form whereby sodium ions in said silicate solution are removed by said resin and replaced with hydrogen ions from said resin.

10. The process of claim 9 wherein said beverage is beer.

11. The process of claim 10 wherein said nitrogeneous carbonyl containing organic material is gelatin.

12. The process of claim 11 wherein said gelatin is added to said beer before said polysilicic acid is added to said beer.

13. The process of claim 11 wherein the amount of said gelatin is from about 5 to 100 p.p.m., wherein the amount of said polysilicic acid is from about 10 to 300 p.p.m., and wherein the weight ratio of said polysilicic acid to said nitrogeneous carbonyl containing organic material is less than 20.

14. The process of claim 9 wherein said polysilicic acid hydrosol has a pH within the range from 1.5 to 5.0, and wherein the concentration of said polysilicic acid in said hydrosol is within the range from 2% to 7%.

15. The process of claim 14 wherein said beverage is beer and wherein said nitrogeneous carbonyl containing organic material is gelatin.

16. The process of claim 15 wherein the amount of said gelatin is from about 5 to 100 p.p.m., wherein the amount of said polysilicic acid is from about 10 to 300 p.p.m., and wherein the weight ratio of said polysilicic acid to said nitrogeneous carbonyl containing organic material is less than 20.

17. The process of claim 1 wherein said nitrogeneous carbonyl containing organic material and said polysilicic acid are added to the beverage concurrently as it is being transferred from one location to another.

18. The process of claim 17 wherein said beverage is beer and wherein said nitrogeneous carbonyl containing organic material is gelatin.

19. The process of claim 18 wherein the amount of said nitrogeneous carbonyl containing organic material is from about 5 to 100 p.p.m., wherein the amount of said polysilicic acid is from about 10 to 300 p.p.m., and wherein the weight ratio of said polysilicic acid to said nitrogeneous carbonyl containing organic material is less than 20.

20. The process of claim 17 wherein said polysilicic acid hydrosol is obtained by placing an aqueous solution of sodium silicate into intimate contact with a cation exchange resin in its hydrogen form whereby sodium ions in said silicate solution are removed by said resin and replaced with hydrogen ions from said resin.

21. The process of claim 20 wherein said beverage is beer and wherein said nitrogeneous carbonyl containing organic material is gelatin.

22. The process of claim 21 wherein the amount of said nitrogeneous carbonyl containing organic material and the amount of said polysilicic acid added to the beverage are sufficient to decrease the turbidity of the beverage by at least 50%.

23. The process of claim 21 wherein the amount of said nitrogeneous carbonyl containing material is from about 5 to 100 p.p.m., wherein the amount of said polysilicic acid is from about 10 to 300 p.p.m., and wherein the weight ratio of said polysilicic acid to said nitrogeneous carbonyl containing organic material is less than 20.

24. The process of claim 1 wherein the amount of said nitrogeneous carbonyl containing organic material and the amount of said polysilicic acid added to the beverage are sufficient to decrease the turbidity of the beverage by at least 50%.

25. The process of claim 23 wherein the beverage is beer and wherein said nitrogeneous carbonyl containing organic material is gelatin.

26. The process of claim 24 wherein said gelatin and said polysilicic acid are added to the beverage concurrently as it is being transferred from one location to another.

27. The process of claim 26 wherein the amount of said nitrogeneous carbonyl containing organic material added is from about 5 to 100 p.p.m., wherein the amount of said polysilicic acid added is from about 10 to 300 p.p.m., and wherein the weight ratio of said polysilicic acid to said nitrogeneous carbonyl containing organic material is less than 20.

28. The process of claim 1 wherein said polysilicic acid hydrosol has been aged for a period of time which is at least such that the viscosity of said hydrosol starts to increase.

29. The process of claim 28 wherein said beverage is beer and wherein said nitrogeneous carbonyl containing organic material is gelatin.

30. The process of claim 29 wherein said polysilicic acid hydrosol is obtained by placing an aqueous solution of sodium silicate into intimate contact with a cation exchange resin in its hydrogen form whereby sodium ions in said silicate solution are removed by said resin and replaced with hydrogen ions from said resin.

31. The process of claim 30 wherein said gelatin and said polysilicic acid are added to the beverage concurrently as it is being transferred from one location to another.

32. The process of claim 31 wherein the amount of said nitrogeneous carbonyl containing organic material is from about 5 to 100 p.p.m., wherein the amount of said polysilicic acid is from about 10 to 300 p.p.m., and wherein the weight ratio of said polysilicic acid to said nitrogeneous carbonyl containing organic material is less than 20.

* * * * *